US009208642B2

(12) United States Patent
Merari

(10) Patent No.: US 9,208,642 B2
(45) Date of Patent: Dec. 8, 2015

(54) MULTIPLAYER SLOT MACHINE GAMING

(71) Applicant: TouchSpin Gaming AG, Horgen (CH)

(72) Inventor: Naftali Merari, Tel-Aviv (IL)

(73) Assignee: TOUCHSPIN GAMING AG (CH)

( * ) Notice: Subject to any disclaimer, the term of this patent is extended or adjusted under 35 U.S.C. 154(b) by 80 days.

(21) Appl. No.: 13/867,090

(22) Filed: Apr. 21, 2013

(65) Prior Publication Data

US 2013/0281180 A1 Oct. 24, 2013

Related U.S. Application Data

(60) Provisional application No. 61/636,810, filed on Apr. 23, 2012, provisional application No. 61/812,749, filed on Apr. 17, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3225* (2013.01); *G07F 17/3276* (2013.01)

(58) Field of Classification Search
CPC ............ G07F 17/3272; G07F 17/3274; G07F 17/3276; G07F 17/34; G07F 17/3213
USPC ............................................................ 463/20
See application file for complete search history.

(56) References Cited

U.S. PATENT DOCUMENTS

| | | | | |
|---|---|---|---|---|
| 6,142,872 | A * | 11/2000 | Walker et al. | 463/16 |
| 6,503,146 | B2 | 1/2003 | Walker et al. | |
| 2002/0142846 | A1 * | 10/2002 | Paulsen | 463/43 |
| 2003/0114218 | A1 * | 6/2003 | McClintic | 463/25 |
| 2003/0119579 | A1 * | 6/2003 | Walker et al. | 463/20 |
| 2003/0130041 | A1 | 7/2003 | Pascal et al. | |
| 2003/0153385 | A1 * | 8/2003 | Ikeya | G07F 17/32 463/31 |
| 2004/0204235 | A1 * | 10/2004 | Walker | G07F 17/32 463/29 |
| 2005/0014554 | A1 | 1/2005 | Walker et al. | |
| 2009/0325670 | A1 * | 12/2009 | Kelly et al. | 463/20 |

* cited by examiner

*Primary Examiner* — Kevin Y Kim
(74) *Attorney, Agent, or Firm* — SoCal IP Law Group LLP; Steven C. Sereboff

(57) ABSTRACT

Slot Machine Arena provides computerized method and system for managing slot machine gaming sessions, including: adding a plurality of mutually competing players to a multiplayer session wherein a plurality of players play against one another, each added by a module of a hosting client terminal; receiving from each player a bet; calculating an outcome of the gaming session; instructing an outcome rendering on a respective display of each hosting client terminal; and crediting at least one player and debiting at least another player according to the outcome. Other aspects of these embodiments relate to a computer readable medium of computer executable instructions adapted to perform the method; and to a client terminal, interfaced with the gaming system wherein the terminal includes secure wireless communications with the server.

13 Claims, 11 Drawing Sheets

FIG. 8
803
802
804
801
RAISE
MATCH
FOLD
BAR
Spin

MULTIPLAYER SLOT MACHINE GAMING

RELATED APPLICATIONS

This application is a Continuation-in-Part of U.S. Provisional Patent Application Nos. 61/636,810 filed Apr. 23, 2012 and 61/812,749 filed Apr. 17, 2013.

The contents of all of the above applications are incorporated by reference as if fully set forth herein.

FIELD AND BACKGROUND OF THE INVENTION

The present invention, in some embodiments thereof, relates to slot machines and, more particularly, but not exclusively, to slot machine systems involving a plurality of slot machines.

Traditionally, a slot machine was a mechanical gambling machine, operated by inserting coins into a slot and often by pulling down on a long handle. Modern slot machines are more typically involving electronic displays and electronic player interfaces; although some machines still maintain a "legacy" handle. Today, because of the added simplicity of determining complex results, using convenient electronic processors, there are many complex variations of slot machine play; especially for multiple players and respective quasi-public social arena environments.

The following references generally indicate how fragmented the gaming industry is with respect to forming a viable social gaming arena for slot machines; a prime objective being to create a variation of the casino style slot machine environment that is capable of spreading to include active participation from remote locations (e.g. home, office, mobile devices, and the like).

For example, U.S. Patent Application No. 2005/0014554, entitled "Multiplayer gaming device and methods", describes a multiplayer gaming device allows two players to collaboratively play, for example, a Monopoly®-style game against the "house." Each player may have his own game controls, coin dispenser/acceptor, and display screen. A larger display screen may display the game board and player game characters, shared by the two players and operated by the machine. The players may wager a flat fee per game, and are given an amount of game money to use for the duration of the game. Throughout the game, players take turns spinning dice represented on the display of the gaming device, and move around a Monopoly®-style board. As the players move around the board, game money is deducted as they land on properties owned by house players. A player's turn may result in his game piece landing on a game board spot owned by a house player, and cost the player $100 in game money. The game lasts until both players go bankrupt. The total number of game board spaces each player has moved without going bankrupt determines each player's payout.

U.S. Patent Application Publication No. 2003/0130041, entitled "Dynamic tournament gaming method and system", describes a dynamic tournament gaming method and system, including the provision of a plurality of gaming terminals selectively inter-linkable together with a host terminal so that current players of the terminals desiring to participate in group tournament play can be notified of the opportunity and provided with the choice to play or not. If a current player chooses to play, he so signifies, enters his entry fee into the terminal, and awaits start of the event. Upon start of the tournament by the host terminal, the player will play the tournament game over and over as fast as possible to accumulate as many points as possible during a particular pre-announced tournament period. The host terminal will continuously monitor the terminals of all play participants, dynamically record play status, and control termination of the game period. It will also conduct an accounting of the results, issue win results notification, and perhaps provide remote pay-out of game winnings.

U.S. Pat. No. 6,503,146, entitled: "System and method for facilitating casino team play", describes a method for facilitating group play by a team of members associated with a casino slot club. The method includes the steps of identifying the team members, identifying a set of rules designated by the team for rewarding the team members when a payout is due to one of the team members, detecting a payout due to one of the team members, and rewarding the team members in accordance with the set of rules.

SUMMARY OF THE INVENTION

According to some embodiments of the present invention, there is provided a computerized method of managing a slot machine gaming session. The method comprises setting a multiplayer slot machine gaming session wherein a plurality of players play against one another, each the player is added by a different slot machine module loaded in a different hosting client terminal, rendering on a display of each the hosting client terminal a plurality of randomly selected symbols which are assigned to a respective the player from multiple symbols of an emulated slot machine, receiving from each the player at least one betting action pertaining to an outcome of the player's multiplayer slot machine gaming session, calculating the outcome using a processor, and crediting at least one of the plurality of players and debiting at least another of the plurality of players according to the outcome.

Optionally, the plurality of players comprises a player selected from a group consisting of: a live player, a team of live players, and an autonomous program automated agent player.

Optionally, the rendering comprises presenting a first group of the plurality of randomly selected symbols to a respective the player and avoid presenting the first group to at least one another of the plurality of players and presenting a second group of the plurality of randomly selected symbols to the another of the plurality of players.

Optionally, the rendering comprises presenting to each the player a different group of the plurality of randomly selected symbols and avoid presenting one of the plurality of players with randomly selected symbols which are assigned to another of the plurality of players.

Optionally, the setting comprises allowing each the player to select an arrangement of slots of an emulated slot machine reels and presenting the respective plurality of randomly selected symbols on the selected arrangement.

Optionally, the calculating comprises scoring each the plurality of randomly selected symbols according to at least one scoring rule and calculating the outcome according to the scoring.

Optionally, the rendering comprises managing a plurality of gaming iterations wherein in each the iteration each the player is assigned with at least one new symbol; wherein the receiving comprises receiving from at least one of the plurality of players during each the iteration a new betting action pertaining to the outcome.

Optionally, the crediting and the debiting are made with at least one of a game points and game money.

Optionally, the plurality of players are a plurality social network peers.

More optionally, the multiple symbols are extracted from a plurality of images in a plurality of social profiles of the plurality social network peers.

According to some embodiments of the present invention, there is provided a gaming system that comprises a central unit which selects for each of a plurality of players of a multiplayer slot machine gaming session a plurality of randomly selected symbols from multiple symbols of an emulated slot machine and a plurality of slot machine modules each loaded to one of a plurality of client terminals and renders a user interface which presents the plurality of randomly selected symbols to a respective the player and allows the respective player to participate in a multiplayer slot machine gaming session by performing at least one betting action according to the plurality of randomly selected symbols. The central unit manages the multiplayer slot machine gaming session according to the at least one betting action from each the player and credits at least one of the plurality of players and debits at least another of the plurality of players according to an outcome of the multiplayer slot machine gaming session.

According to some embodiments of the present invention, there is provided a computerized method of managing a slot machine gaming session. The computerized method comprises setting a multiplayer slot machine gaming session wherein a plurality of players play against one another via a plurality of client terminals, rendering an emulated slot machine on a display of each the client terminal, allowing each the player to select an arrangement of slots of the emulated slot machine, rendering for each the player on a respective the selected arrangement a plurality of randomly selected symbols which are assigned thereto from multiple symbols of the emulated slot machine, receiving from each the player at least one betting action pertaining to an outcome of the player's multiplayer slot machine gaming session based on the plurality of randomly selected symbols, calculating the outcome using a processor, and crediting at least one of the plurality of players and debiting at least another of the plurality of players according to the outcome.

Optionally, the plurality of randomly selected symbols are sequentially presented to a respective the player in a plurality of gaming iterations.

Optionally, the arrangement of slots is selected from a plurality of arrangements which are presented to the plurality of players, the at least one betting action comprises a plurality of betting actions taken each taken in a different the iteration.

Optionally, while a first player of the plurality of players selects a first arrangement and a second player of the plurality of players selects a second arrangement, the first arrangement and the second arrangement share at least one slot of the emulated slot machine and do not share another slot of the emulated slot machine.

Unless otherwise defined, implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

All publications, patents and patent applications mentioned in this specification are herein incorporated in their entirety by reference into the specification, to the same extent as if each individual publication, patent or patent application was specifically and individually indicated to be incorporated herein by reference. Furthermore, to the extent that section headings are used, they should not be construed as necessarily limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified flowchart diagram of a computerized method of managing a slot machine gaming session, according to some embodiments of the present invention;

FIG. 2 is a schematic illustration of a gaming system, according to some embodiments of the present invention;

FIG. 3A is an exemplary screenshot showing an emulated slot machine with multiple slots which are assigned to a number of different players who play one against the other, according to some embodiments of the present invention;

FIG. 3B and FIGS. 4-7 are exemplary screenshots diagrams showing a progressive slot machine gaming session user interfaces for an exemplary slot machine game, according to some embodiments of the present invention;

FIG. 8 is an exemplary screenshot depicting a slot machine gaming session user interface for a slot machine game wherein social network peers play one against the other, according to some embodiments of the present invention;

Figure 9:
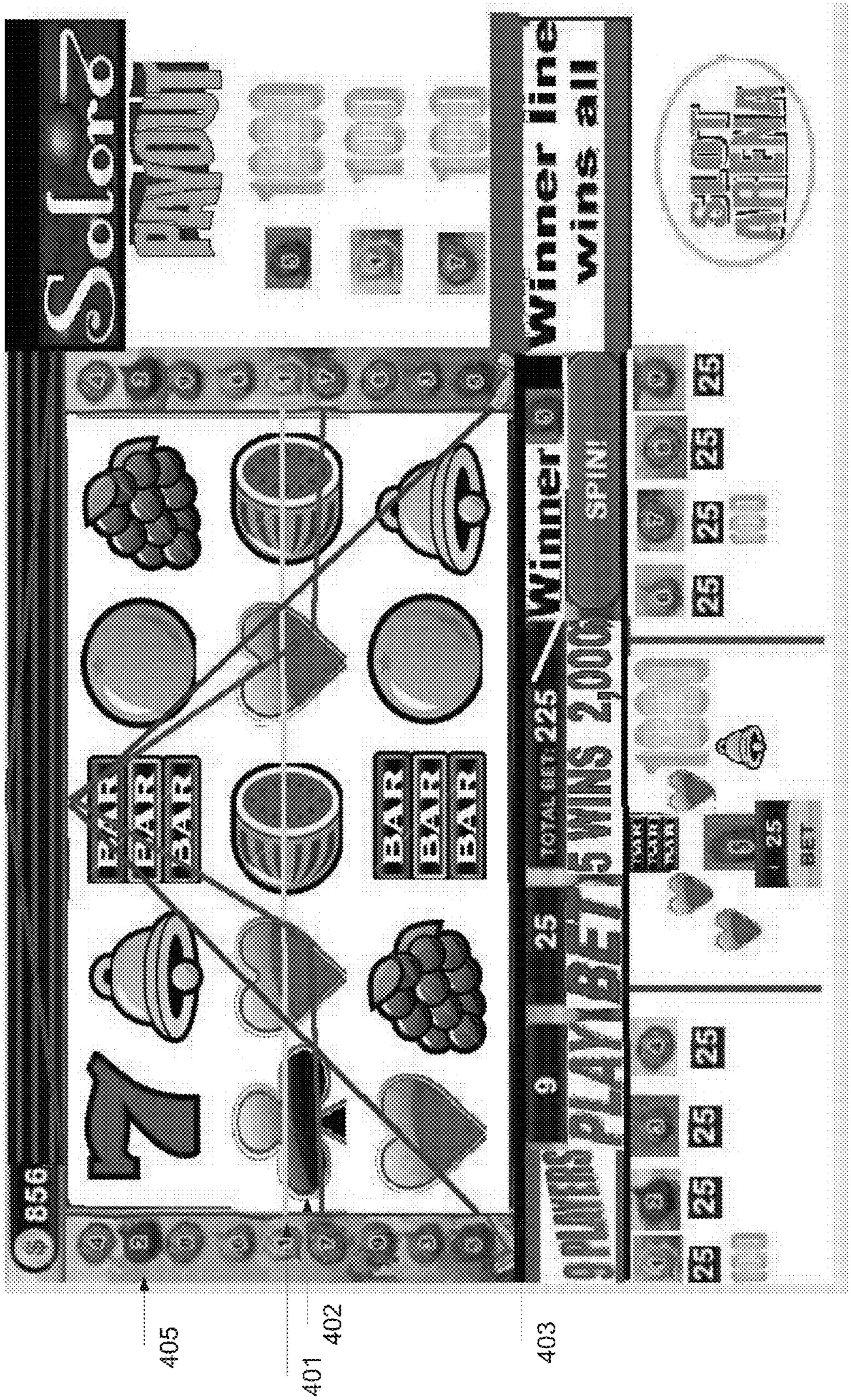
Figure 10:
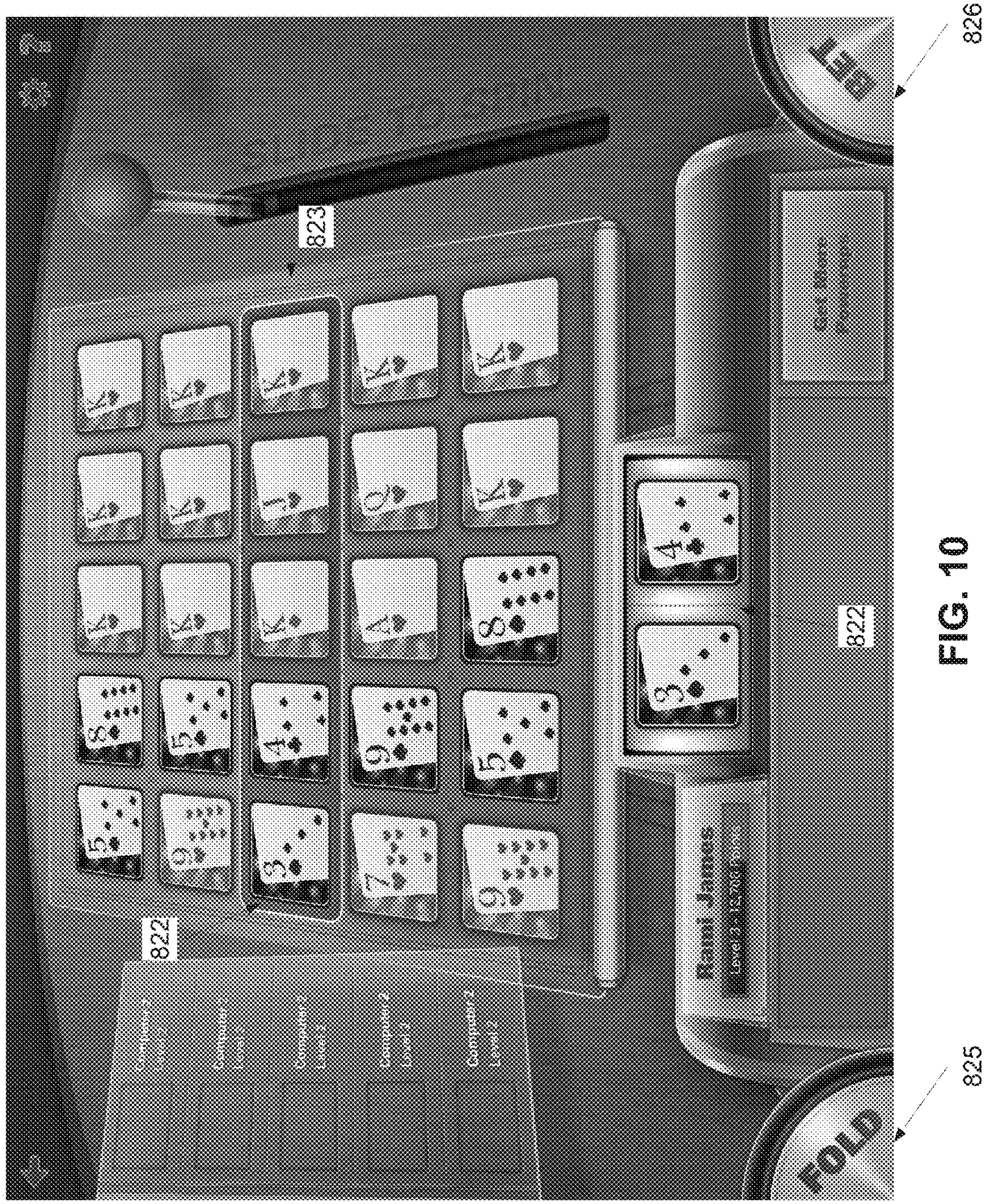

FIG. 9 is an exemplary screenshot depicting a slot machine gaming session user interface for another exemplary slot machine game, according to some embodiments of the present invention; and FIG. 10 is an exemplary screenshot depicting a slot machine gaming session user interface for a slot machine game that shows the combination of symbols of each one if the players, for example social network peers, according to some embodiments of the present invention;

wherein, for all figures, like numeration represents like functionality, albeit instantiations and valuations presented at respective functionality locations may vary according to the example narrated by the accompanying textual descriptions herein.

DESCRIPTION OF EMBODIMENTS OF THE INVENTION

The present invention, in some embodiments thereof, relates to slot machines and, more particularly, but not exclusively, to slot machine systems involving a plurality of slot machines. Substantially, the present invention, in some embodiments thereof, also relates to a slot machine arena and, more particularly, but not exclusively, to methods and system for enabling a plurality of players to participate in a multi-player slot machine game and/or gaming session wherein they play one against the other. The multiplayer slot machine game is optionally between peers of a social network community.

Before explaining at least one embodiment of the invention in further detail, it is to be understood that the invention is not necessarily limited in its application to the details of construction and the arrangement of the components and/or methods set forth in the description and/or illustrated in the drawings and/or the examples. The invention is capable of other embodiments or of being practiced or carried out in various ways.

According to some embodiments of the present invention, there is a central unit, for example one or more servers which manages the multiplayer slot machine game and a plurality of client terminals with respective interactive user interfaces. The central unit and the client terminals communicate, optionally over a secured connection. Accordingly, an implementation may allow players to gain respective access to the common server via a computer network, such as the internet, Ethernet, and/or the like. Now, each player engages some identification registration with the server and there-before (and/or there-after) the player loads, for example downloads, enabling software for the gaming session (and optionally for continuations of that session or of previous sessions). Embodiments of the user interfaces include a graphic user interface (GUI) which is interacted with by an input device, such as a touch screen, a touch pad, a mouse, and/or a keyboard. An alternative non-graphic user interfaces may include voice recognition software and a microphone, or the like. According to some instant embodiments, social networking aspects of a gaming session may include bilateral messaging or broadcast communications between players, invitations between players to form a gaming session or to join a gaming session, and the like. According to some embodiments, a single platform, for example within a single casino enterprise gaming space, provides a plurality of user interfaces which allow a plurality of player to participate in a multiplayer slot machine game against each other.

During a slot machine arena gaming session players are presented with slots' symbols according to playing rules. Each player is assigned with a random combination of symbols according to slots which are assigned to her. As used herein, a slot may refer to a cell or a position, optionally emulated, in which slot symbols are dynamically presented. The value of the combination of symbols is determined according to a set of rules. The winner(s) and/or loser(s) are set according to the values of their symbol combinations. Optionally, from a player perspective, a player is presented with randomly selected symbols of virtual reels of a slot machine via virtual slots (positions). Some of the randomly selected symbols may be privately presented to players while other selected symbols are publically exposed, optionally sequentially, to all players. This presentation may be part of a dynamic electronic display or a static printed notice on the players gaming interface terminal. One variation of the slot machine gaming arena session assigns one (or more) symbols in respective private slots to each player, and then iteratively presents a measured sequence of symbols in public slots.

Symbols fallen randomly in some slots, referred to herein as public slots, maybe presented to all players, optionally sequentially according to a gaming process. Symbols fallen randomly in some other slots, referred to herein as private slots, maybe privately presented to different players so that each player is presented with symbols in certain slots and not presented with symbols in other slots. In such embodiments, players may be presented intermittently with an option to place, match, and/or increase bets and/or fold from a round of betting. Optionally, in each multiplayer gaming session a player either wins at least some of the pool of bets or loses at least some of her bets. Briefly stated, embodiments of the present invention firstly enable competitive betting for slot machine games wherein aspects of the slot machine are public to the respective players; and may also include aspects of the slot machine that are private to the respective players. These aspects change the social dynamics for the slot machine arena players; to create a dynamic tension of inter-player competition, probability clustering anticipation, and intense gambler curiosity; that is more typical of classical on-site casino game play.

As exemplified below, the ability of a remote player to participate in a multiplayer slot machine game against players and to place a bet based on symbols randomly selected in her private slots expands the attractiveness of slot machine play to a wider and increasingly remote audience.

Optionally, players are allowed to bet at each interval before and between the disclosure of each public symbol; and according to the predetermined rules, the slot machine game session concludes when either a predetermined number of collective symbols have been disclosed and respectively bet upon or when the aggregation of one player's private symbol (s) with some or all of the collective symbols arrives at a winning combination. Then, betting amounts may be assigned to a single winner of the session or divided proportionally between the more advantageous players; again according to the predetermined playing rules. An alternative slot machine gaming session may be enabled with an iterative series of small groups of collective symbols, from which each respective player selects one (or more) and places his bet; which is then combined with his selection(s) from the next small group of collective symbols, etc. until a predetermined number of such groups have been presented, respectively selected, and bet upon; or until a predetermined winning combinations have been achieved by one (or more) of the players. Again the betting pool is appropriately divided at the end of the session according to the rules of play.

Figure 1:
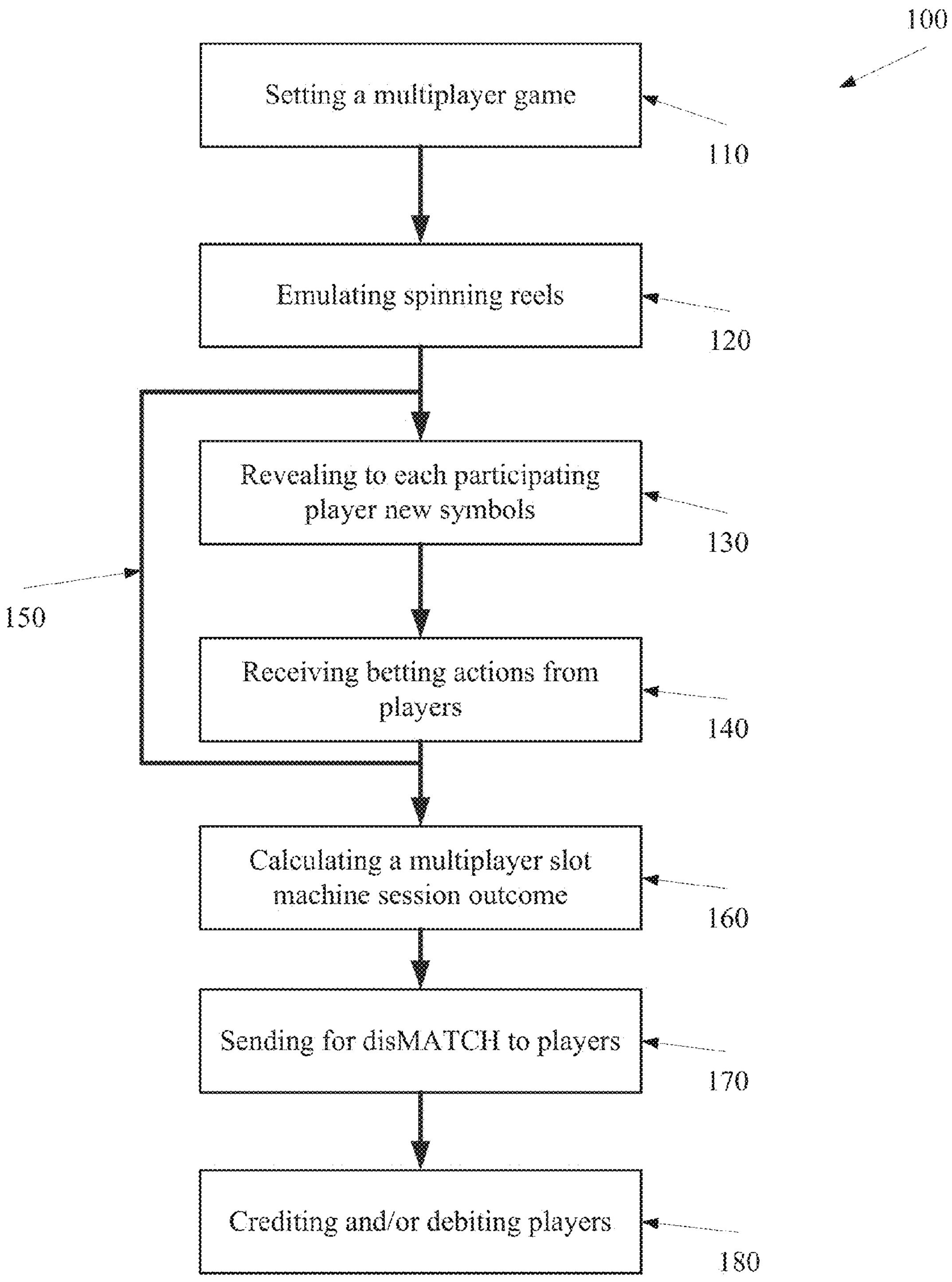
Figure 2:
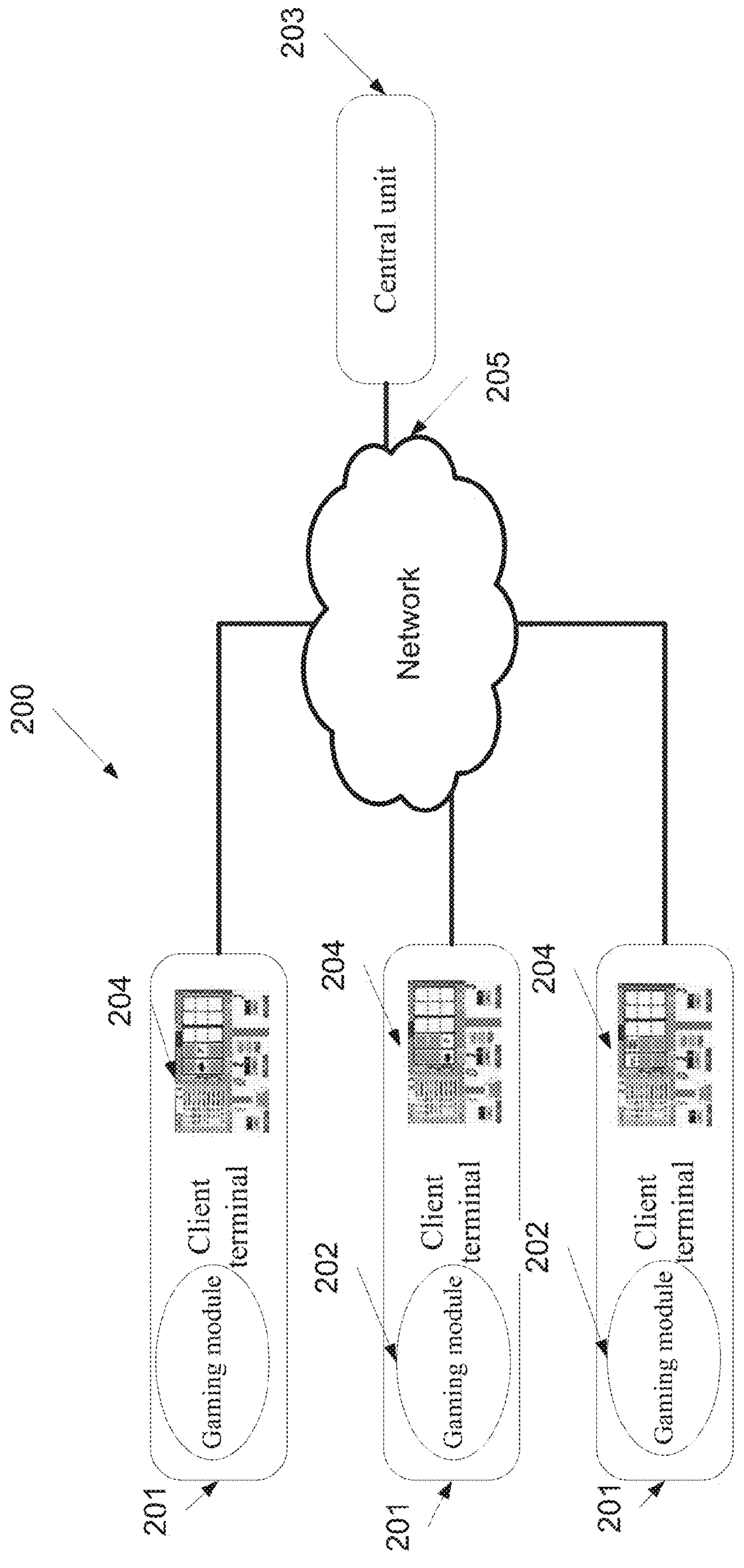

Reference is now made to FIG. 1, which is a simplified flowchart of a computerized method 100 of managing a slot machine gaming session, according to some embodiments of the present invention. Reference is optionally also made to FIG. 2 which is a schematic illustration of a system that allows implementing the method 100. The system 200 includes a plurality of gaming module 202 which are loaded, for example using a browser and/or as independent applications, to a plurality of client terminals 201, such as tablets, Smartphones, desktops, laptops, thin clients and/or any computing device with network connection. The system 200 further includes a central unit 203, for example one or more servers.

Figure 3A:
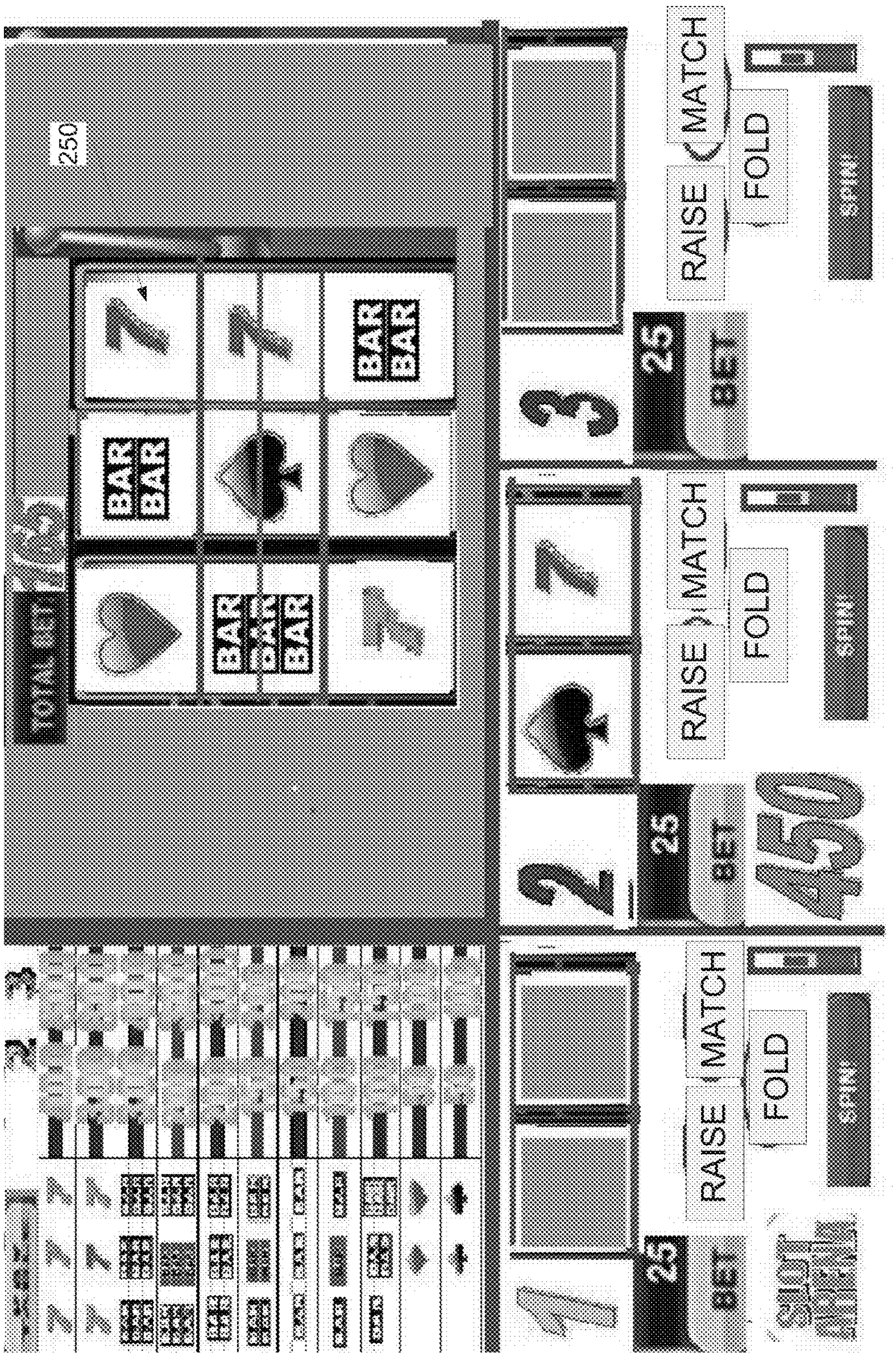
Figure 3B:
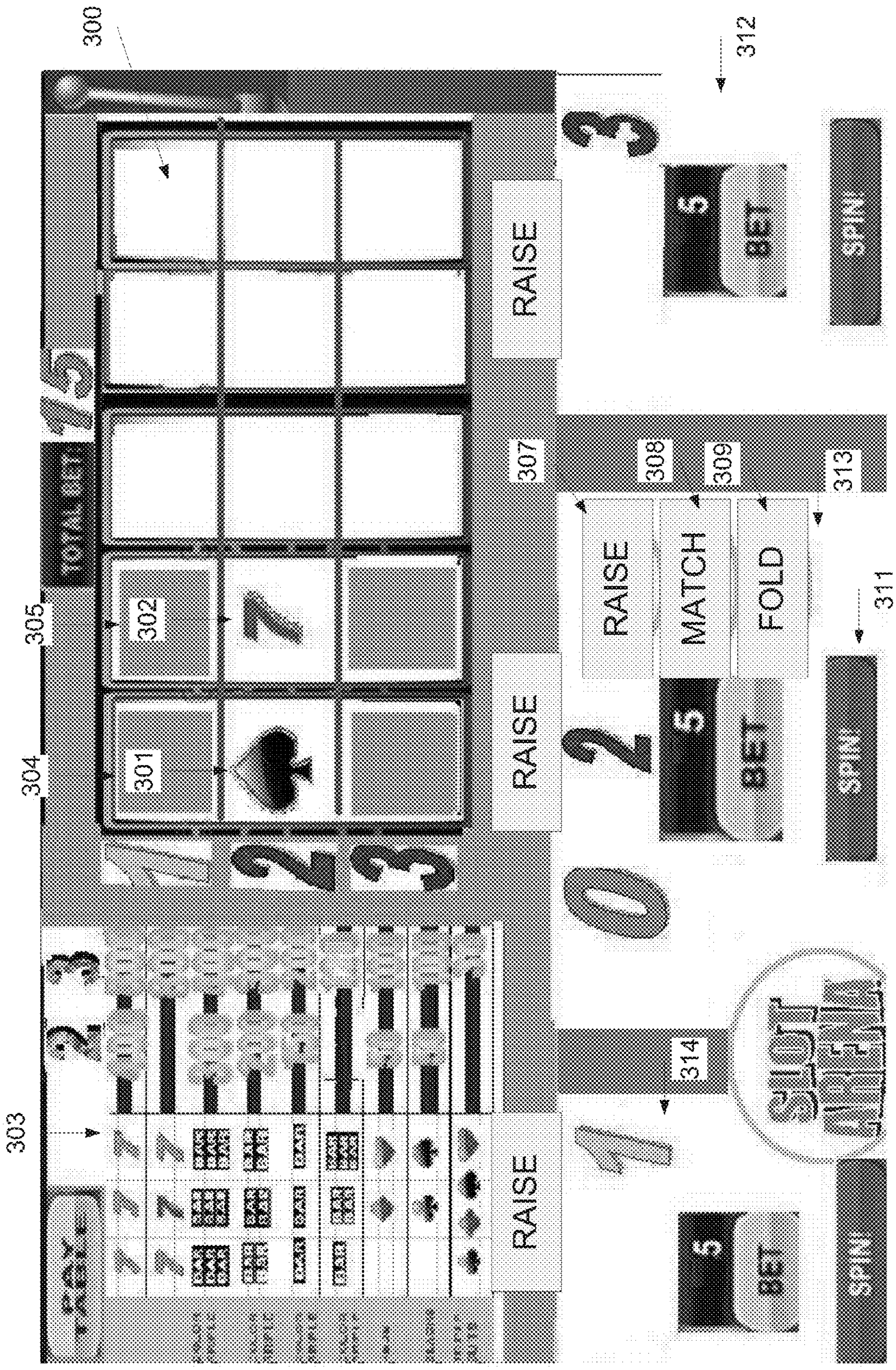

First, as depicted in 110, a multiplayer slot machine gaming session between a plurality of players is set and optionally managed by the central unit 203. A player may be a human player or an agent executed on a computing module, for example by the central unit 203. Each one of the players is added by a respective slot machine module 202 which installed in and/or rendered on the display of his client terminal. The slot machine module 202 creates a temporary communication linkage with a gaming manager hosted in the central unit 203 and a plurality of players. As shown at 120, once the slot machine gaming session is established, the spinning of virtual reels is optionally emulated and rendered on the display of each one of the players. The number of reels (rotating helix of symbols) may vary, so that the embodiment described above (having two private symbols and three public symbols) is only one of a number of player interface game variations. Essentially there are various symbols which can be presented in private and/or public slots. Symbols are optionally predetermined in shape, size, color, accompanying optional sound, and static point value (for isolated symbols that do not otherwise combine to higher point values). Optionally, symbols may be dynamically adapted according to the playing players, for example using images selected from their social profile. Optionally, symbols may be dynamically adapted according to the players using the system 200, for example images selected from social profile of top players, images of top players, and/or images selected by players. Then, as shown at 130, each player is presented with a combination of symbols assigned thereto. For example, each player is presented with a combination of symbols in private slots which are presented only on her client terminal. For example, FIGS. 3A and 3B are exemplary screenshots of GUIs which depict reels 250, 300 of a slot machine. In FIG. 3A all the slots are public and presented to all players while different slots are assigned to different players, for example different lines of slots to different players. In FIG. 3B however, while private slots 301, 302 of the reels are exposed to the player, private slots which are assigned to other players, for example 304-305 are disguised. It should be noted that any number of private slots 301, 302 may be assigned to players.

As shown at 140, each of the players may take a betting action based on the combination of symbols presented thereto in his private slots. The betting actions are sent as messages and received at the managing central unit 203. As used herein, a betting action means placing a bet, withdrawing from the game, matching a bet, increasing an existing bet, and/or folding from a round of betting and/or a bet. The bet may be on real and/or virtual resources, for example game money and/or points credit purchased in a designated online store or otherwise achieved by performing player actions. Optionally, the betting action is accepted after the players instruct spinning the reel, for example by clicking on a spin button, such as 311 in FIG. 3B. As further described below and outlined above, multiple gaming iterations and respective rounds of betting may be held. Optionally, GUI that is presented to the player allows the player select a betting action, for example by a click on a suitable button, for example buttons 307-309 in FIG. 3B.

Figure 4:
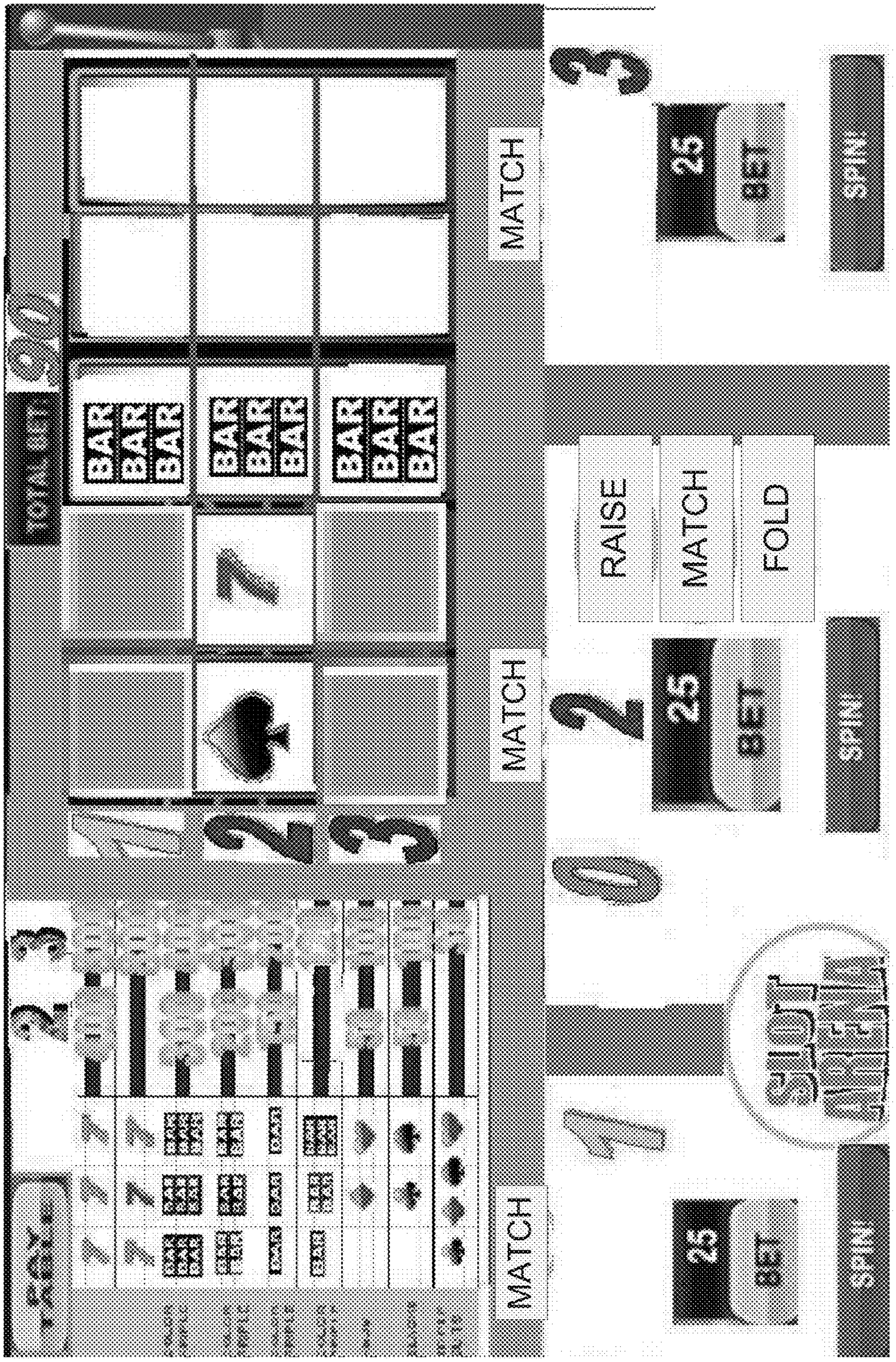
Figure 5:
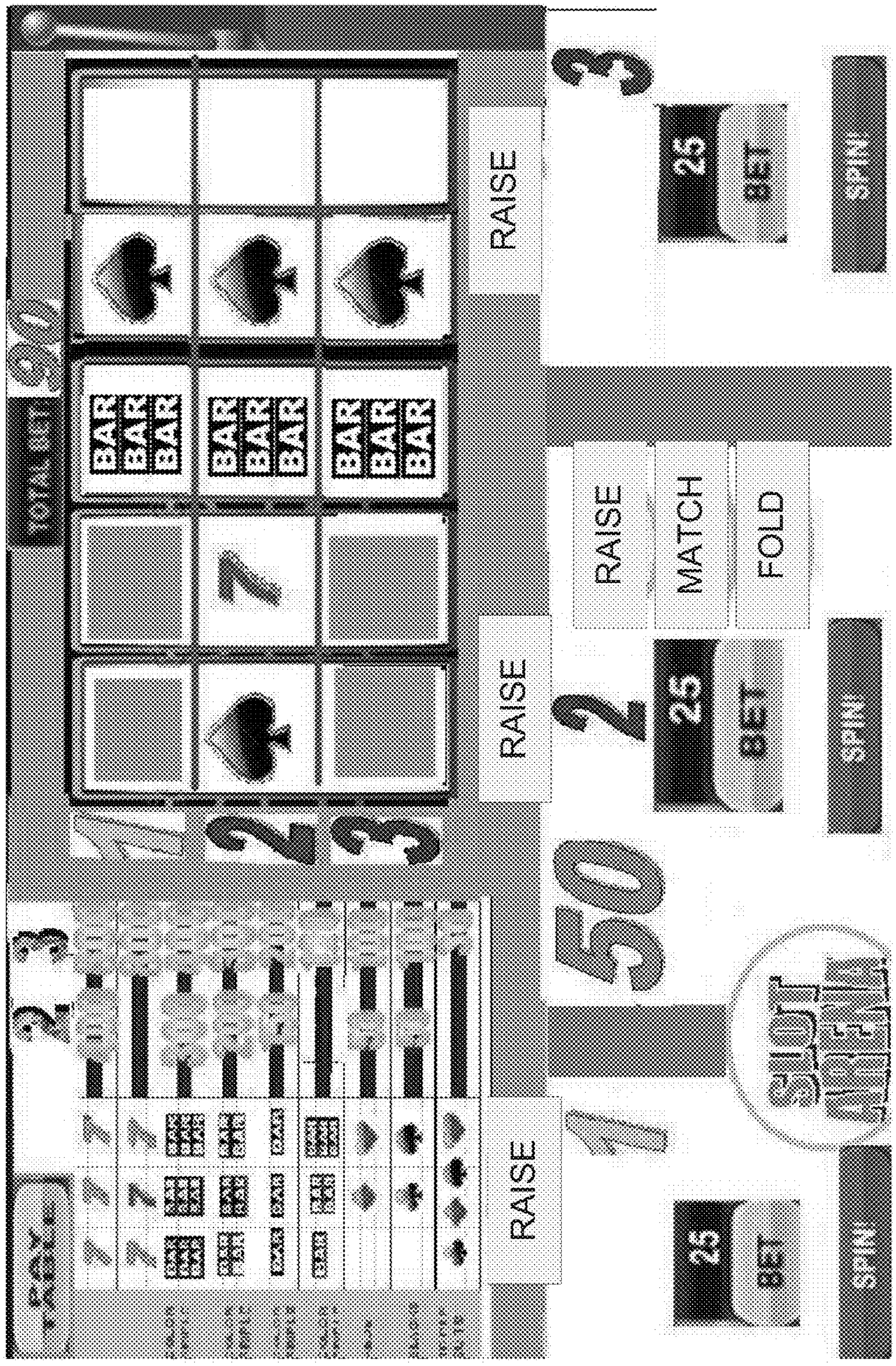
Figure 6:
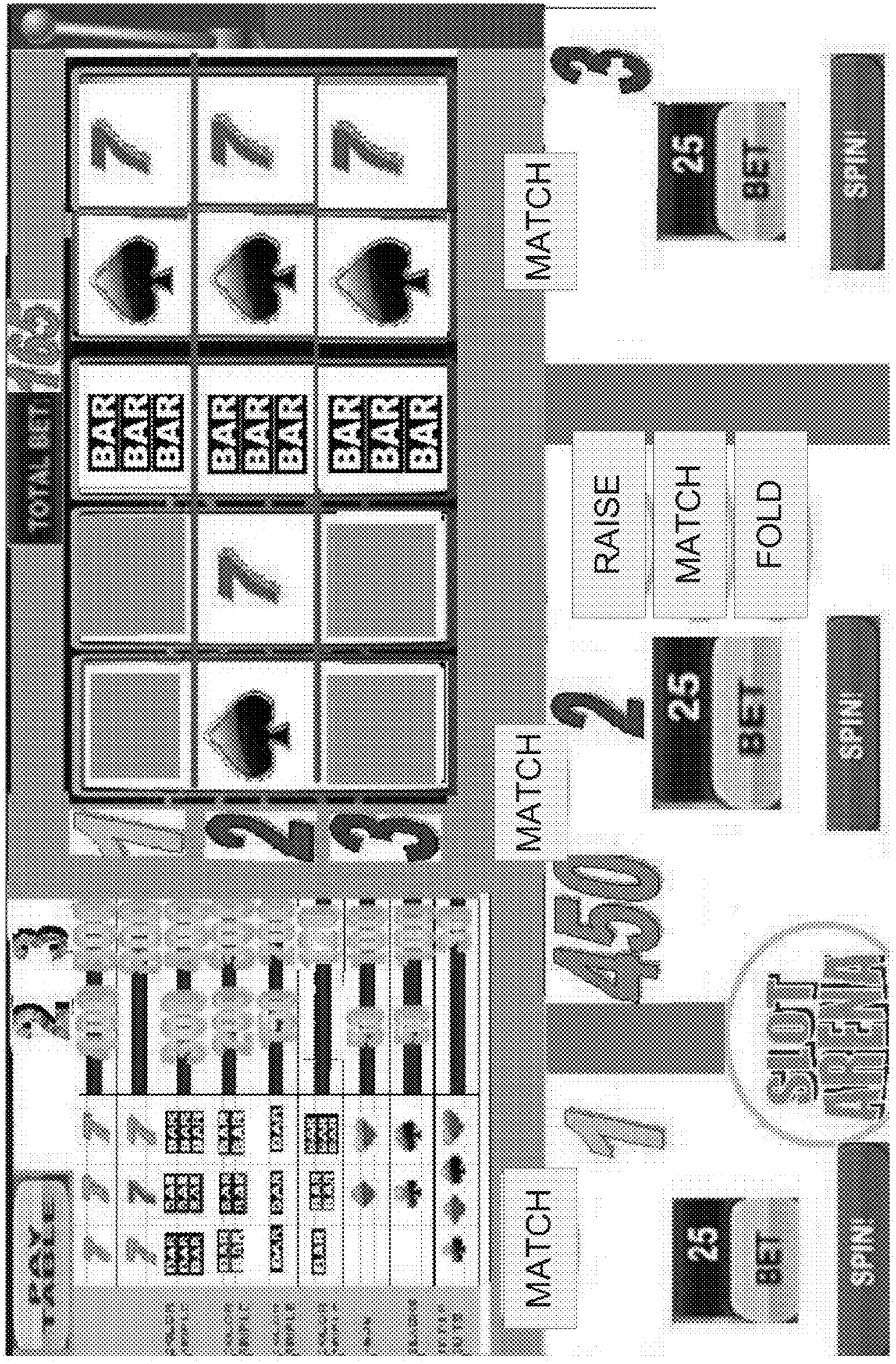
Figure 7:
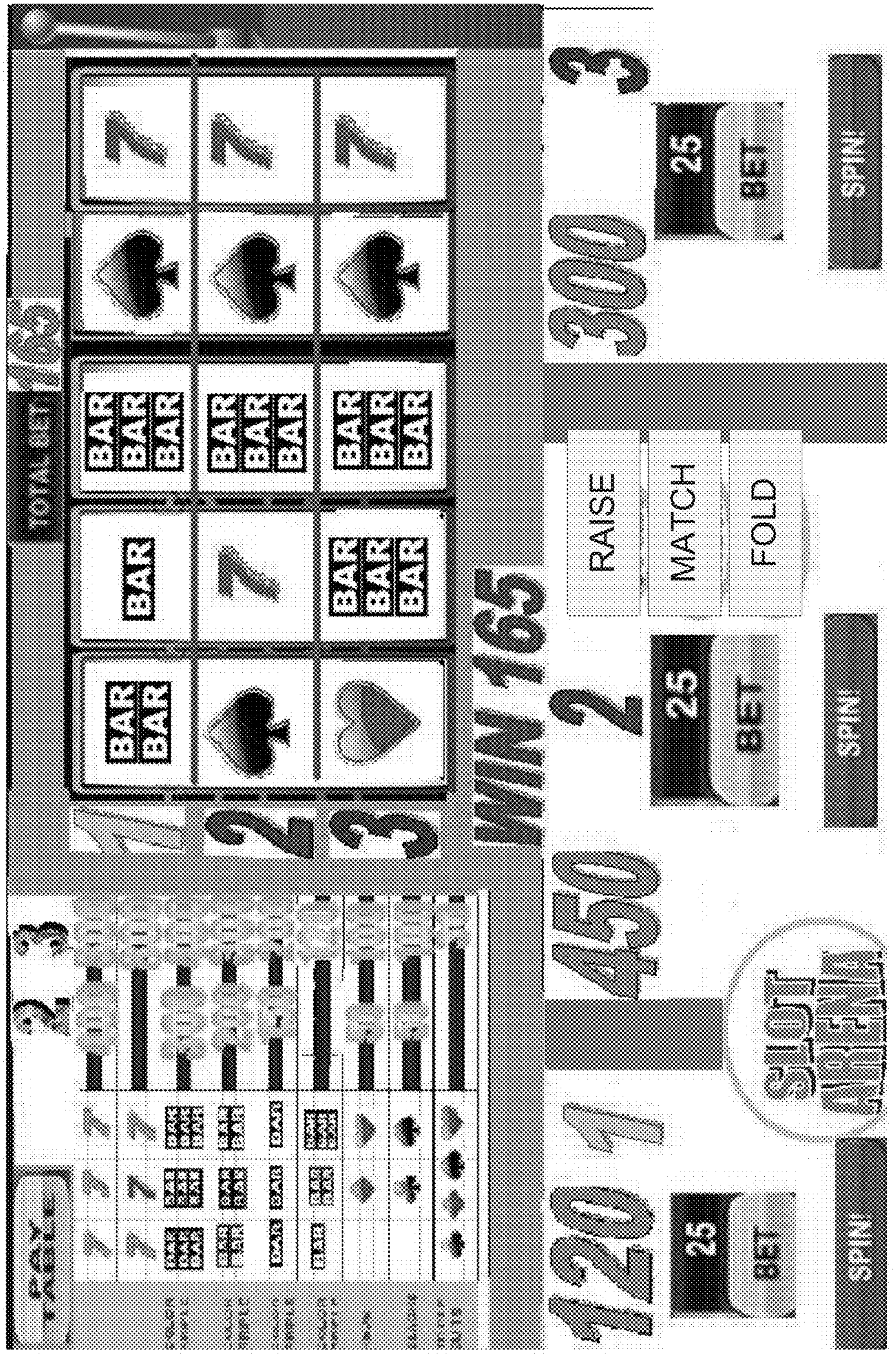

Optionally, as shown at 150, 130 and 140 may be repeated in a plurality of gaming iterations. For example, private and/or public slots may be sequentially revealed, allowing a player to take a number of betting actions based on each of the sequentially revealed slots. In each one of the gaming iterations, each player may increase her respective bet by; thereby increase a betting pool. The winning player is the one who has arrived at the highest combination with respect to the combinations arrived at by the other players. For example, in the first gaming iteration, for example as depicted in FIG. 3B, two private slots are revealed to each player. Then, at the second gaming iteration, for example as depicted in FIG. 4, a first public slot is revealed to the players. Then, at the third gaming iteration, for example as depicted in FIG. 5, a second public slot is revealed to the players. Then, at the fourth gaming iteration, for example as depicted in FIG. 6, a third public slot is revealed to the players. In each one of the gaming iterations, the player can perform a betting action based on the combination of symbols which are associated therewith. Optionally, even when all the symbols in all the private slots are revealed, the player still does not see nor know the symbols assigned to other players; nor does he know the aggregate point valuation for the other players. This example effectively exemplifies the objective of presenting the competitive slot machine arena environment and atmosphere. Each player may add an additional bet, increasing the betting pool. A the end of this round of betting, all of the players are shown the private symbols of all of the other players and optionally their respective aggregate point valuations, and the identity of the winning combination therewith, for example as depicted in FIG. 7 wherein player 2 wins.

Eventually, after betting round(s) and gaming iteration(s) are complete, an outcome for the multiplayer slot machine gaming session is calculated by the central unit 203, as depicted in 160. Optionally, for each player, a score based on a combination of symbols in her private slots and symbols in the public slots is calculated. The scores of all the players are matched, facilitating the identification of winner(s) and/or loser(s) according to predetermined symbol combination rules. For example, numeral 303 in FIG. 3B depicts a list of scoring rules indicative of which score is assigned for which combination. Optionally, as shown at 170 the outcome is sent from the central unit 203 to each slot machine module 202 and rendered on a display 204 for the benefit of a player. Optionally, as shown at 180, based on the outcome of the reels of the virtual slot machine, one or more players are credited while one or more of the others are debited. Furthermore, there are embodiments of the instant invention which relate to a computer readable medium which have computer executable instructions adapted to perform the aforesaid methodological actions, and such other actions as may be appropriate for variations of these embodiments.

According to some embodiments of the present invention, the central unit 203 manages multiplayer gaming sessions held in a social network arena, such as Facebook™, Myspace™, Google+™ and/or the like. In such embodiments, the multiplayer gaming sessions may be held between social network peers, optionally as an application of the social network service.

Figure 8:

For example, reference is now made to FIG. 8, which is an exemplary user interface set to be presented on a client terminal, according to some embodiments of the present invention. As shown at 801, thumbnail images of the participating players are presented to the user. The user, which is optionally player 2, is privately presented with symbols in private slots 802. All players are presented with the symbols in the public slots 803. An emulated shaft 804 may be used as a playing indication. As depicted in FIG. 8, the user interface presents the outcome of a number of slot machines, for example of the private slots of the players.

Another example is depicted in FIG. 10, which is an exemplary screenshot depicting a slot machine gaming session user interface for a slot machine game that shows the combination of symbols of each one if the players, for example social network peers, according to some embodiments of the present invention. In such embodiments, the user is privately presented with symbols in private slots 822. All players are presented with the symbols in the public slots 823. As depicted in FIG. 10, the user interface presents the outcome of a number of 5 slot machines in a comparative manner, for example the private and public slots of the players, after and/or during the slot machine gaming session 822. This exemplary machine gaming session user interface includes side buttons 825 and 826 which are adapted for fast and confirmable touch screen control.

As outlined above, symbols in private slots are presented to a certain player and symbols in public slots are presented to all players.

Turning now to an exemplary procedural ordering of a slot machine gaming session, an initial bet is placed when each player only has his respective personal knowledge of his own two symbols. Each player has the opportunity to establish and place his respective bet, optionally to match the bet of others, to increase his bet relative to the bets of others in the same slot machine gaming session, or to abandon the round—and with it his bet amount up until this point; which remains in a common betting pool. Optionally, players bet in wagering currency units. The betting order is optionally from left to right on the display interfaces 312-314.

Now, when this has been respectively accomplished for all interface of all respective players, begins the second round of betting among the players of this slot machine arena slot machine gaming session. In this round another (left most) symbol is presented in a public slot of the display interface. Once this symbol is displayed to all player of the playing round, begins the betting of this second round of betting; which is based on the two private symbols of the player and on the first public symbol. After conclusion of the betting of the second round, begins the spinning and revelation of a second symbol (central to the three symbol portions of the public symbol area of the display interface), which now allows a third round of betting among the remaining players of the slot machine gaming session. This third round of betting is based on the two private symbols for each player and on the two public symbols known to all players. Thereafter, the right most symbol portion of the public symbols spins and resolves to reveal a third public symbol; which now allows the start of a fourth round of betting—which is respectively based on the two private symbols for each respective player and on the three public symbols that are known to all players. At the end of the fourth betting round, the player with the highest aggregation of symbol points is to win the slot machine gaming session.

The slot machine gaming session may be accomplished on a single machine where each player has respective private viewing of his respective private symbols; or the slot machine gaming session may be accomplished on a plurality of designated slot machines where each player uses a physically separated personal slot machine. Typically, there are gaming rule variations which assign higher point values for combinations of matching symbols.

Reference is now made to FIG. 9, which is a screenshot of an exemplary GUI that allows each player to select an arrangement of slots which are assigned to him, according to some embodiments of the present invention. In these embodiments, a player selects an arrangement that includes a slot in each reel. For example, lines 401-403 are indicative of a set of different arrangements which a player may choose from. During the game session, slots assigned to a player may be private and/or public slots, for example as described above.

In the exemplary GUI depicted in FIG. 9, three rows are of slots are depicted. In use, the player may select any of various arrangements covering a different combination of symbols from the three rows of symbols. For example, an arrangement may be selected by clicking one of the icons to the side of the reels, for example 405. Each of the icons is numerated for identification purposes. The player chooses one of the nine combinations lines. The winning player is the one with a combination that achieves the highest point valuation. It should be noted that the arrangement may be selected in various manner, for example by clicking on selected slots from different reels. As depicted in FIG. 9, different arrangements selected by different players may share shared slots. In such embodiments, shared slot may be private for the respective players only.

It is expected that during the life of a patent maturing from this application many relevant player interfaces will be developed and the scope of the term the instant slot machine arena is intended to include all such new technologies a priori.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of managing a slot machine gaming session, comprising:

- setting a multiplayer slot machine gaming session wherein at least three players play against one another on respective slot machines having separate displays, each said player is added by a different slot machine module loaded in respective slot machines, and each player is allowed to select an arrangement of reels of their respective slot machine wherein at least two of the slot machines respectively include:
  - at least one public reel in which identical symbols are always assigned to all slot machines having the public reel, and
  - at least one private reel in which the symbols are assigned independently of other reels of the same slot machine and the reels of the other slot machines;
- causing a plurality of randomly selected symbols to be rendered for each player on a display of each player's respective slot machine, wherein the symbols are assigned to the reels of a respective player's slot machine from multiple possible symbols;
- receiving from each said player at least one betting action pertaining to an outcome of said player's multiplayer slot machine gaming session;
- calculating said outcome using a processor wherein the player with the highest score wins, and a score for each player is based on a combination of the symbols in the player's private reels and, for those players having public reels in their slot machines, the symbols in the public reels; and
- crediting at least one of said plurality of players and debiting at least another of said plurality of players according to said outcome.

2. The method of claim 1, wherein said rendering comprises presenting a first group of said plurality of randomly selected symbols to a respective said player and avoid presenting said first group to at least one another of said players and presenting a second group of said plurality of randomly selected symbols to said another of said players.

3. The method of claim 1, wherein said calculating comprises scoring each said plurality of randomly selected symbols according to at least one scoring rule and calculating said outcome according to said scoring.

4. The method of claim 1, wherein said rendering comprises managing a plurality of gaming iterations wherein in each said iteration each said player is assigned with at least one new symbol; wherein said receiving comprises receiving from at least one of said players during each said iteration a new betting action pertaining to said outcome.

5. The method of claim 1, wherein said crediting and said debiting is made with at least one of a game points and game money.

6. The method of claim 1, wherein said players are peers of a social network community.

7. The method of claim 6, wherein said multiple symbols are extracted from a plurality of images in a plurality of social profiles of the peers of the social network community.

8. A computer readable medium comprising computer executable instructions adapted to perform the method of claim 1.

9. A gaming system comprising:

a central unit which selects for each of a plurality of slot machines of a multiplayer slot machine gaming session a plurality of randomly selected symbols from multiple symbols for reels of the respective slot machine, wherein at least three of the slot machines have separate displays and respectively include:

at least one public reel in which identical symbols are always assigned to all slot machines having the public reel, and at least one private reel in which the symbols are assigned independently of other reels of the same slot machine and the reels of the other slot machines;

a plurality of slot machine modules each loaded to one of a plurality of the slot machines and renders a user interface which presents said plurality of randomly selected symbols to a respective player of the slot machine and allows said respective player to participate in a multiplayer slot machine gaming session by performing at least one betting action according to said plurality of randomly selected symbols;

wherein said central unit manages said multiplayer slot machine gaming session according to said at least one betting action from each said player and credits at least one of said players and debits at least another of said players according to an outcome of said multiplayer slot machine gaming session, wherein the player with the highest score wins, and a score for each player is based on a combination of the symbols in the player's private reels and, for those players having public reels in their slot machines, the symbols in the public reels.

10. A computerized method of managing a slot machine gaming session, comprising:

setting a multiplayer slot machine gaming session wherein at least three players can play against one another on respective slot machines having separate displays;

allowing each said player to select a respective arrangement of reels of their respective slot machine, wherein at least two of the slot machines respectively include:

at least one public reel in which identical symbols are always assigned to all slot machines having the public reel, and at least one private reel in which the symbols are assigned independently of other reels of the same slot machine and the reels of the other slot machines;

causing a display to be rendered for each said player on a respective selected arrangement of a plurality of randomly selected symbols which are assigned thereto from multiple symbols of said slot machine;

receiving from each player at least one betting action pertaining to an outcome of the multiplayer slot machine gaming session;

calculating said outcome using a processor, wherein the player with the highest score wins, and a score for each player is based on a combination of the symbols in the player's private reels and, for those players having public reels in their slot machines, the symbols in the public reels; and crediting at least one of said players and debiting at least another of said players according to said outcome.

11. The method of claim 10, wherein said plurality of randomly selected symbols are sequentially presented to a respective player in a plurality of gaming iterations.

12. The method of claim 11 wherein said arrangement of slots is selected from a plurality of arrangements which are presented to said players, said at least one betting action comprises a plurality of betting actions taken each taken in a different said iteration.

13. A computer readable medium comprising computer executable instructions adapted to perform the method of claim 10.

* * * * *